United States Patent
Sano et al.

[11] Patent Number: 5,933,289
[45] Date of Patent: Aug. 3, 1999

[54] MAGNETIC RECORDING/REPRODUCING DEVICE WITH WIRELESS TRANSMISSION OF POSITION CONTROL SIGNAL TO HEAD TRANSDUCER ON ROTARY DRUM

[75] Inventors: Akira Sano; Toyoshi Makino, both of Nagaokakyo, Japan

[73] Assignee: Mitsubishi Denki Kabushiki Kaisha, Tokyo, Japan

[21] Appl. No.: 08/852,961

[22] Filed: May 9, 1997

Related U.S. Application Data

[62] Division of application No. 08/266,893, Jul. 5, 1994, Pat. No. 5,675,449.

[30] Foreign Application Priority Data

Jul. 6, 1993 [JP] Japan .................................. 5-166867

[51] Int. Cl.⁶ .................................................. G11B 5/584
[52] U.S. Cl. ............................................ 360/77.16; 360/108
[58] Field of Search ................................. 360/77.16, 108, 360/64, 75, 77.13

[56] References Cited

U.S. PATENT DOCUMENTS

| | | | |
|---|---|---|---|
| 4,485,418 | 11/1984 | Bremmer . | |
| 4,819,096 | 4/1989 | Grant et al. | 360/108 |
| 4,827,360 | 5/1989 | Kawasaki et al. | 360/64 |
| 4,882,635 | 11/1989 | Sanai . | |
| 4,967,290 | 10/1990 | Grant et al. | 360/64 |
| 4,985,785 | 1/1991 | Matsuoka et al. | 360/64 X |
| 5,036,418 | 7/1991 | Willmann et al. . | |
| 5,191,489 | 3/1993 | Isozaki | 360/64 |
| 5,293,277 | 3/1994 | Shimazaki et al. | 360/64 |
| 5,343,342 | 8/1994 | Kanagawa et al. | 360/77.16 |

FOREIGN PATENT DOCUMENTS

| | | |
|---|---|---|
| 0595633 | 5/1994 | European Pat. Off. . |
| 3722927 | 1/1988 | Germany . |
| 54-36709 | 3/1979 | Japan . |
| 59-019206 | 1/1984 | Japan . |
| 1303605 | 12/1989 | Japan . |
| 397115 | 4/1991 | Japan . |
| 8806783 | 2/1988 | WIPO . |

OTHER PUBLICATIONS

"High–Bandwidth Optical Channel for Rotating–Head Magnetic Tape", Research Disclosure, No. 342, Oct. 1992, Havant GB, p. 782.

Primary Examiner—Aristotelis M. Psitos
Assistant Examiner—James L Habermehl

[57] ABSTRACT

The present invention provides a movable magnetic head unit including a signal transmission element. The transmission element transmits by wireless, i.e., through noncontact transmission, a control signal for driving an electromechanical transducing element fixed to a rotary magnetic head. Therefore, noises are prevented from appearing on a display, and stable compensation in the deviation of the magnetic head and a high reliability of the magnetic head unit can be attained.

22 Claims, 13 Drawing Sheets

FIG. 10
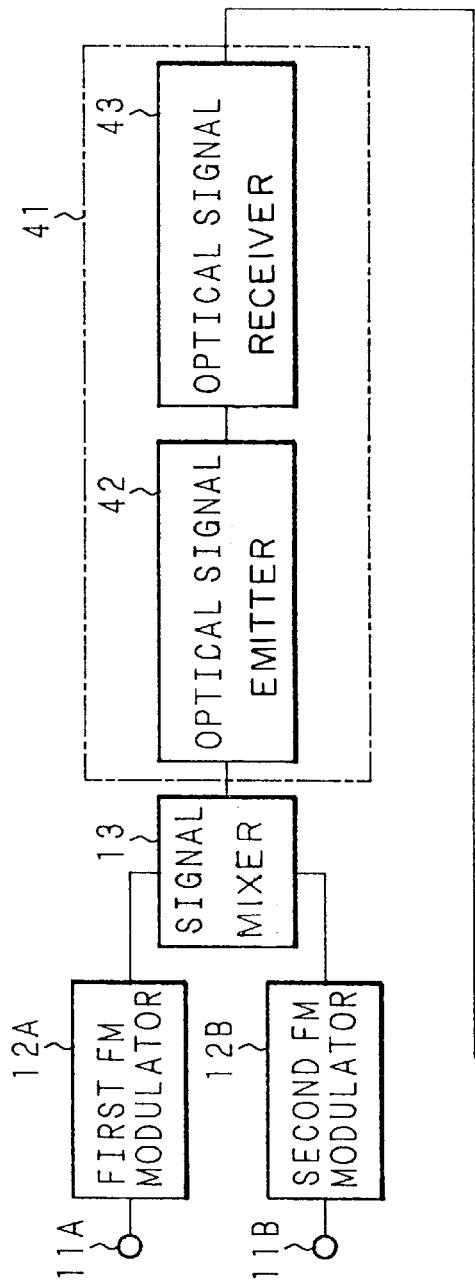
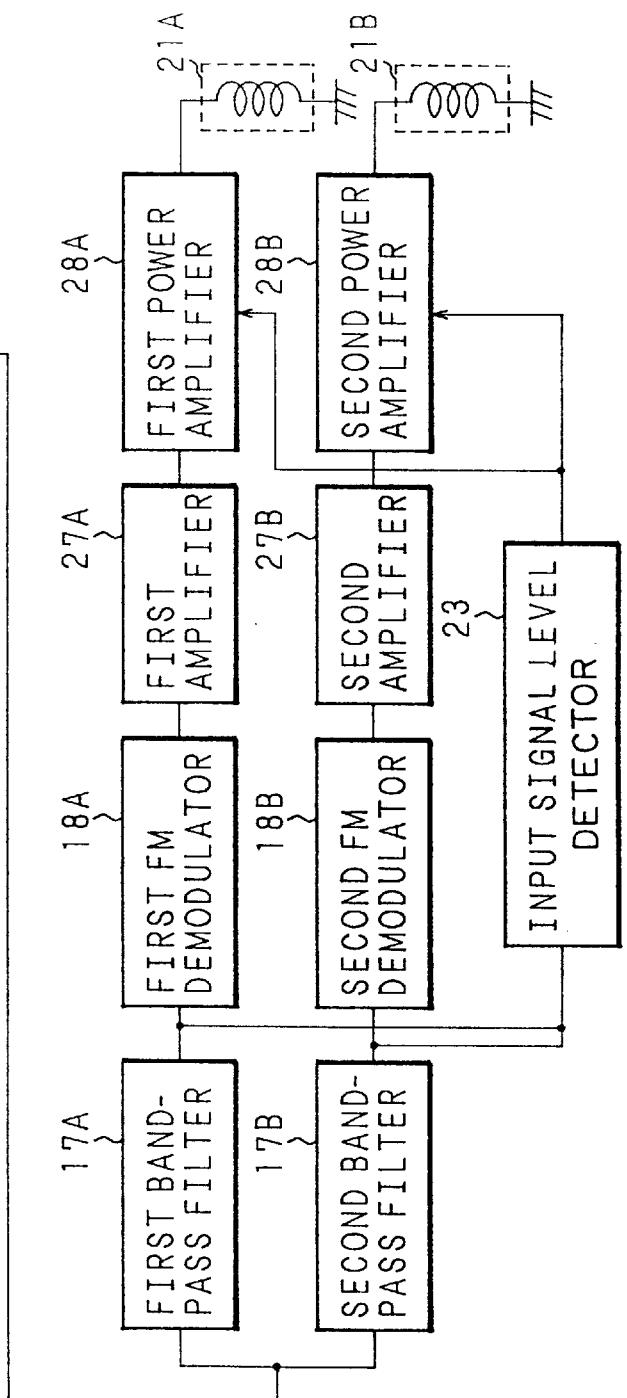

5,933,289

MAGNETIC RECORDING/REPRODUCING DEVICE WITH WIRELESS TRANSMISSION OF POSITION CONTROL SIGNAL TO HEAD TRANSDUCER ON ROTARY DRUM

This application is a divisional of application Ser. No. 08/266,893 filed on Jul. 15, 1994, now U.S. Pat. No. 5,675,449 the entire contents of which are hereby incorporated by reference.

BACKGROUND OF THE INVENTION

1. Field of the Invention

The present invention relates to a movable magnetic head unit such as a magnetic recording/reproducing device with a recording and reproducing function that has means for transmitting a control signal for driving a movable magnetic head.

2. Description of Related Art

FIG. 1 is a partial cutaway vertical sectional view of a rotary drum including an electromagnetically driven type actuator used in a conventional magnetic recording/reproducing device. As shown in FIG. 1, an electromagnetically driven type actuator 21A is fixed to an upper drum 5 with a screw 9, and is rotatable around a rotation axis 3. The rotation axis 3 is supported by bearings 4 fixed to a lower drum 2. A magnetic tape 1, that is, a magnetic recording medium, is obliquely slid along a tape guide (not shown) on the outer surfaces of the upper drum 5 and the lower drum 2.

A magnetic head 6 for recording and reproducing an image signal is adhered to the top of a movable plate disposed on the actuator 21A. The magnetic head 6 can be moved in the direction along the rotation axis 3 in accordance with a control signal. Such a control signal is produced so as to make optimal a signal reproduced at the magnetic head 6, and is transmitted to a slip-ring 8 via a brush 7 to be supplied to the actuator 21A.

In FIG. 1, reference numerals 33 and 34 denote a lower transformer and an upper transformer in a rotary transformer, respectively. The upper transformer 34 is fixed to the upper drum 5 so as to be rotatable around the rotation axis 3. On a surface of the upper transformer 34 opposing the lower transformer 33, a plurality of grooves are formed concentrically with the rotation axis 3, and a coil is provided in each of these grooves. The lower transformer 33 is fixed to the lower drum 2. On a surface of the lower transformer 33 opposing the upper transformer 34, a plurality of grooves are also formed concentrically with the rotation axis 3, and a coil is provided in each of these grooves.

A signal to be recorded on the magnetic tape 1 is sent from the coils in the grooves of the lower transformer 33 to the coils in the grooves of the upper transformer 34 to be supplied to the magnetic head 6. In the reproducing operation, the magnetic head 6 reads a recorded signal from the magnetic tape 1, and the read signal is transmitted by the route reverse of that in the recording operation.

Further, the rotary drum has another similar actuator 21B on the other side of the rotation axis 3 so as to oppose the actuator 21A. These two actuators are controlled as follows:

FIG. 2 is a block diagram showing a conventional magnetic recording/reproducing device having two electromagnetically driven type actuators as above. A first and a second control voltage input terminals 11A and 11B in FIG. 2 are respectively provided with regard to the electromagnetically driven type actuators (i.e., electromechanical transducing elements; hereinafter referred to as the "actuators") 21A and 21B. A first control signal inputted through the first control voltage input terminal 11A is inputted to a first amplifier 19A having a voltage shifting function and is amplified to have a voltage in accordance with the positional change of the actuator 21A. For simplification of the entire system design, the first actuator 21 A is set to be moved, for example by 0 micron when the output voltage of the first amplifier 19A is 0 volt (V).

The output of the first amplifier 19A is inputted to a first power amplifier 20A. The first power amplifier 20A amplifies the voltage of the output signal from the first amplifier 19A at an amplification rate in accordance with a signal inputted through a power amplification control signal terminal 26. The signal outputted from the first power amplifier 20A is supplied to the first actuator 21A via the brush 7 and the slip-ring 8. A second control signal inputted through the second control voltage input terminal 11B is also treated in the similar manner. The description of the treatment of the second control signal is herein omitted, but is apparent from FIG. 2 in which like elements are shown with like reference numerals followed by B instead of A. The output from the first power amplifier 20A or the second power amplifier 20B is selectively outputted to the brush 7 by supplying a switching signal to one of change-over switches 24 through a switching control signal terminal 25.

FIG. 3 shows a sectional view of one of the actuators. Reference numerals 101 and 102 denote cylindrical permanent magnets. A magnetic material referred to as a pole piece 103 is provided between the permanent magnets 101 and 102, thereby forming magnetic fluxes 110 as shown in FIG. 3. The permanent magnets 101 and 102 and the pole piece 103 are surrounded with a hollow cylindrical bobbin 104, which is wound with a coil 105. The cylindrical bobbin 104 is fixed inside of a yoke 108 having a lower flat spring 106 and an upper flat spring 107 therebetween.

A magnetic head 109 is provided at one end of the lower flat spring 106. When a current is allowed to flow through the coil 105 in the counterclockwise direction seen from the above of the drawing, a force to push down the bobbin 104 is generated owing to the interaction with the magnetic fluxes 110, resulting in lowering the magnetic head 109. When a current is allowed to flow in the reverse direction, the magnetic head 109 is raised.

The conventional rotary drum generally has another magnetic head disposed so as to oppose the abovementioned magnetic head. In other words, the rotary drum has another actuator similar to that shown in FIG. 3. As is described referring to FIG. 2 above, the first and the second actuators are controlled by first and second control signals, respectively. The control process of the second actuator 21B is identical to that of the first actuator 21A except that the phase of the second control voltage to be inputted through the second input terminal 11B is shifted at an angle of 180° degrees from that of the first control voltage. The shift between the first control voltage and the second control voltage is caused by the positional differences of the two magnetic heads.

When the aforementioned magnetic recording/reproducing device is used, control signals are supplied to the actuators 21A and 21B, thereby changing the positions of the magnetic heads (shown with the reference numeral 6 in FIG. 1) provided on the actuators 21A and 21B.

In such a conventional magnetic recording/reproducing device, a control signal for driving the actuator is sent to the upper drum by using the brush and the slip-ring as described above. As a result, a fretting noise as well as an electrical noise caused by temporary noncontact between the brush and the slip-ring are generated. Especially in the reproducing operation, such a noise jumps into reproduced signals to cause a white dot noise to appear on a monitoring display. Thus, the quality of the reproduced image is degraded.

In order to solve this problem, the contact pressure between the brush and the slip-ring can be raised so as to reduce the number of noises on the display. This, however, makes the brush wear rapidly, resulting in shortening the useful life of the brush. This method is therefore useful when the brush and the slip-ring can be regularly checked or exchanged, but is nearly impossible to adopt for home appliances which are difficult to be regularly checked. Therefore, it has been desired to develop an inexpensive magnetic head unit of a driving signal transmission system with a high reliability that can be also used for home appliances.

SUMMARY OF THE INVENTION

The present invention was attained to solve the above-mentioned problems. The objective thereof is providing a signal transmission system for a magnetic recording/reproducing device with a high reliability in which a control signal for the positional change of a magnetic head is steadily and stably transmitted without causing an electrical noise due to a mechanical contact; and providing a magnetic recording/reproducing device in which a magnetic head is set at a predetermined position by electrically compensating the mechanical deviation of the magnetic head caused in the process of mounting the magnetic head on an electromechanical transducing element.

In the magnetic recording/reproducing device of this invention, a rotary magnetic head is mounted on an electromechanical transducing element such as an electromagnetically driven type actuator. A control signal for moving the magnetic head in the direction vertical to the track of a magnetic tape is frequency modulated by a frequency modulator, and then, the modulated signal is supplied to a frequency demodulator via wireless transmission means such as a rotary transformer and optical signal transmission means.

Since the control signal is transmitted wirelessly by the rotary transformer or through optical transmission in this manner, extremely fewer electrical noises are caused as compared in a conventional contact transmission system using a brush, a slip-ring and the like. Further, there is no need to consider the abrasion of such an element. Therefore, a desired transmission can be steadily and stably conducted.

Moreover, in the magnetic recording/reproducing device of this invention, a frequency modulated signal is demodulated at the same carrier frequency as used in the frequency modulator. Therefore, a crosstalk caused between the control signal and speech and image signals is prevented by transmitting a DC component of the control signal and setting the frequency band of the modulated signal in a desired band.

Furthermore, in the magnetic recording/reproducing device of this invention, when a signal to be recorded and/or reproduced by the rotary magnetic head is transmitted, the current value of the frequency modulated signal inputted to the rotary transformer is adjusted based on the level of the recorded or reproduced signal.

Further, in the magnetic recording/reproducing device of this invention, the frequency modulated signal is modulated to have a band which is lower than the luminance carrier frequency band of an image signal, higher than a audio signal carrier frequency band and does not overlap a higher frequency part of the speech carrier frequency band.

Alternatively, the frequency modulated signal can be in a band lower than the carrier frequency band of a low-pass band-pass converted color signal.

Further, when the magnetic recording/reproducing device of this invention has a rotary transformer in the transmitter, the rotary transformer has a plurality of coils wound concentrically thereon, and the frequency modulated signal is applied to the outermost coil among them. In addition, one or both of the coils adjacent to the coil for the frequency modulated signal are terminated.

Therefore, a crosstalk caused among the coils is prevented depending upon the operation mode of the rotary magnetic head. A crosstalk between the coil for the frequency modulated signal and the other coils is prevented by the terminated coil(s).

Furthermore, the magnetic recording/reproducing device of this invention has a level detector, which detects the level of a frequency modulated signal having been transmitted by the rotary transformer and outputs a control signal for setting the magnetic head at a predetermined position to the electromechanical transducing element when the detected level is lower than a desired level. The level detector has a hysteresis against the detection level.

Therefore, when the control signal is lower than a desired level, a mechanical deviation of the rotary magnetic head caused in the mounting process can be electrically compensated so as to place the magnetic head at the predetermined position. As a result, a larger tolerance can be attained in the accuracy in the components and assembling of the electromechanical transducing element, and the resultant electromechanical transducing element can be used also for home appliances. Moreover, because of the hysteresis characteristic against the detection level, the electromechanical transducing element is prevented from becoming uncontrollable and being damaged due to a sharp level change of a control signal.

In another embodiment, the magnetic recording/reproducing device of this invention has plural electromechanical transducing elements, a signal mixer for mixing frequency modulated signals having been modulated by the frequency modulator to be supplied to the transmitter, and a signal separator for separating the frequency modulated signals from the mixed signal.

Therefore, the plural electromechanical transducing elements are controlled by one transmitter.

In still another embodiment, in the magnetic recording/reproducing device of this invention, a control signal for the positional change of the rotary magnetic head is a digital signal. After the parallel digital signal is converted into a serial signal, the converted signal is transmitted via a wireless transmitter such as an optical signal transmitter to be supplied to a digital—analog converter.

Furthermore, the transmitter of the magnetic recording/reproducing device of this invention has a digital modulator for modulating the converted serial signal, an optical signal emitter for converting the digital modulated signal into an optical signal to be outputted, an optical signal receiver for receiving the optical signal and converting it into a digital signal, and a digital demodulator for demodulating the converted digital modulated signal to be supplied to the digital analog converter.

Furthermore, the magnetic recording/reproducing device of this invention has a level detector for detecting the level of a serial signal transmitted by the optical signal transmitter and outputting a control signal with a desired voltage to the electromechanical transducing element when the detected level is lower than a desired level. The level detector further makes a serial—parallel signal converter or digital—analog converter output a control signal with a desired voltage. The level detector has a hysteresis against the detection level.

Furthermore, in the magnetic recording/reproducing device of this invention, the optical signal receiver is provided on a rotation axis including the rotation center of the rotary magnetic head.

In still another embodiment, the magnetic recording/reproducing device of this invention has plural electromechanical transducing elements, signal mixers for mixing converted serial signals to be supplied to the respective electromechanical transducing elements and sending the mixed signal to the transmitter, and signal separators for separating the serial signals from the mixed serial signal. The mixed serial signals have, in each unit word, and ID code indicating the correspondence to one of the respective electromechanical transducing elements.

Therefore, since a digital control signal is transmitted wirelessly as in the optical transmission, extremely fewer mechanical noises are caused as compared in the conventional contact transmission system using a brush, a slip-ring and the like. Further, there is no need to consider the abrasion of such an element. Therefore, a desired transmission can be steadily and stably conducted.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and further objects and features of the invention will more fully be apparent from the following detailed description with the accompanying drawings, which are given by way of illustration only and thus are not limitative, and wherein:

FIG. 10 is a block diagram of part of a magnetic recording/reproducing device of Example 2.

DESCRIPTION OF THE PREFERRED EMBODIMENTS

The present invention will now be described referring to the accompanying drawings.

EXAMPLE 1

Figure 1:
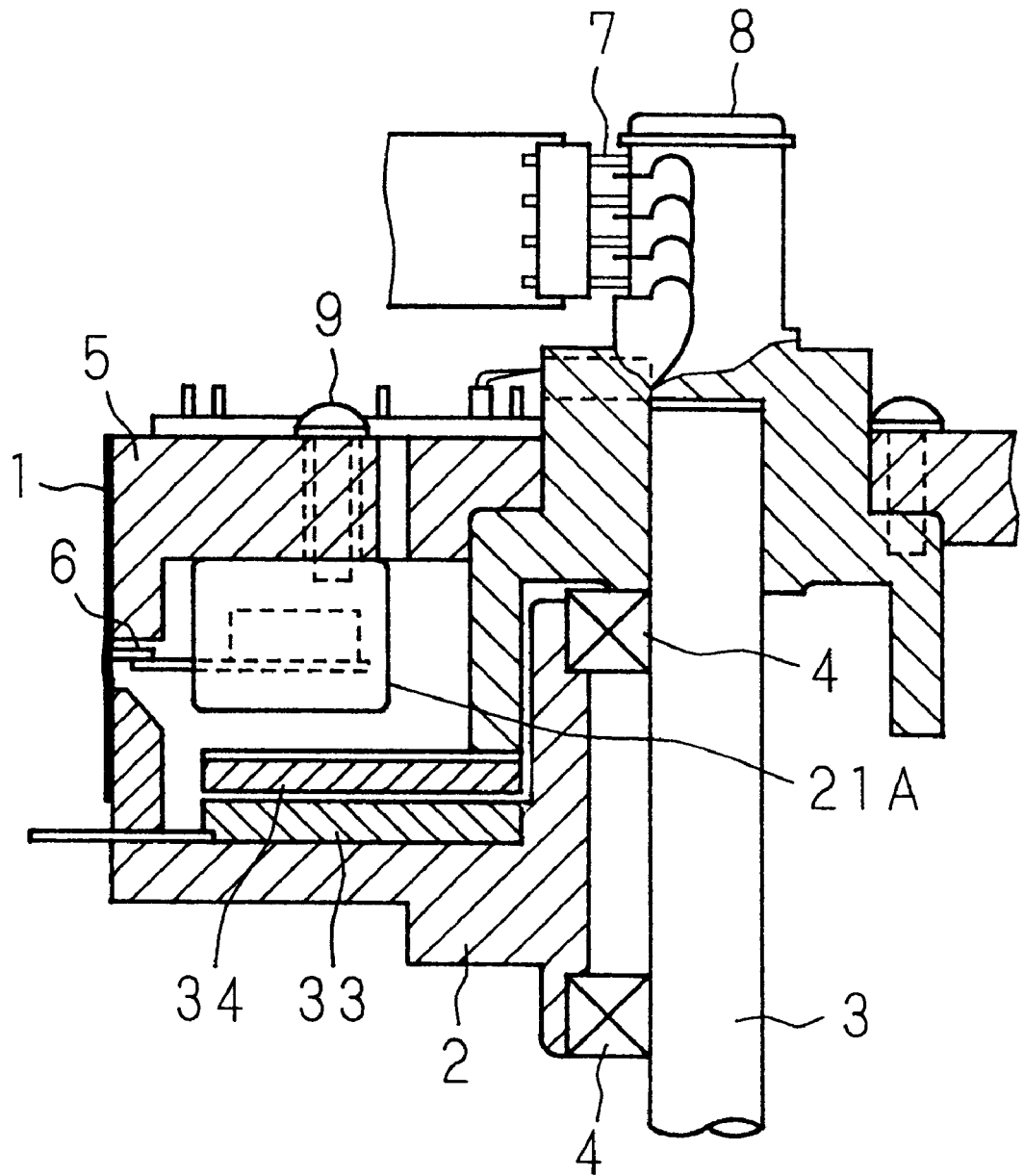
FIG. 1 is a partial cutaway vertical sectional view of a rotary drum used in a conventional transmission system.
Figure 2:
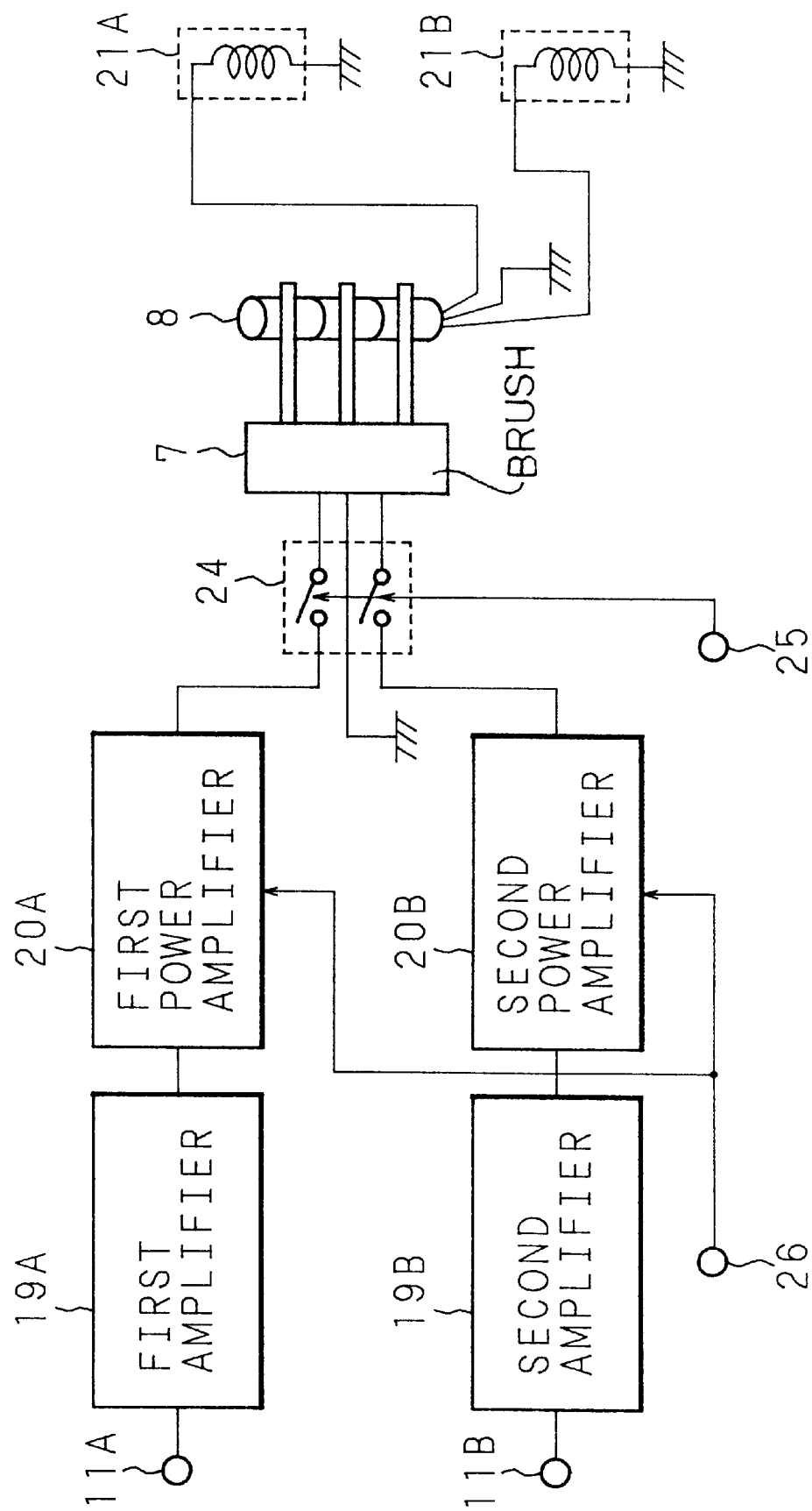
FIG. 2 is a block diagram showing the conventional transmission system.
Figure 3:
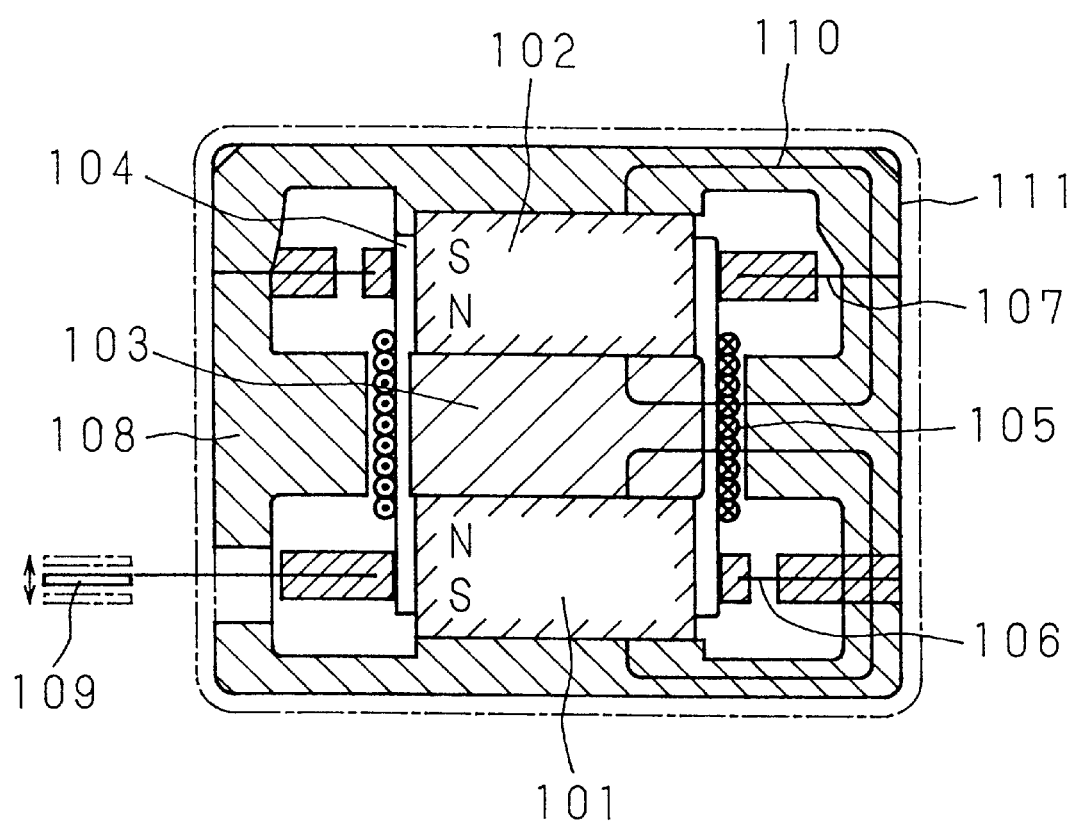
FIG. 3 is a sectional view of a conventional actuator.
Figure 4:
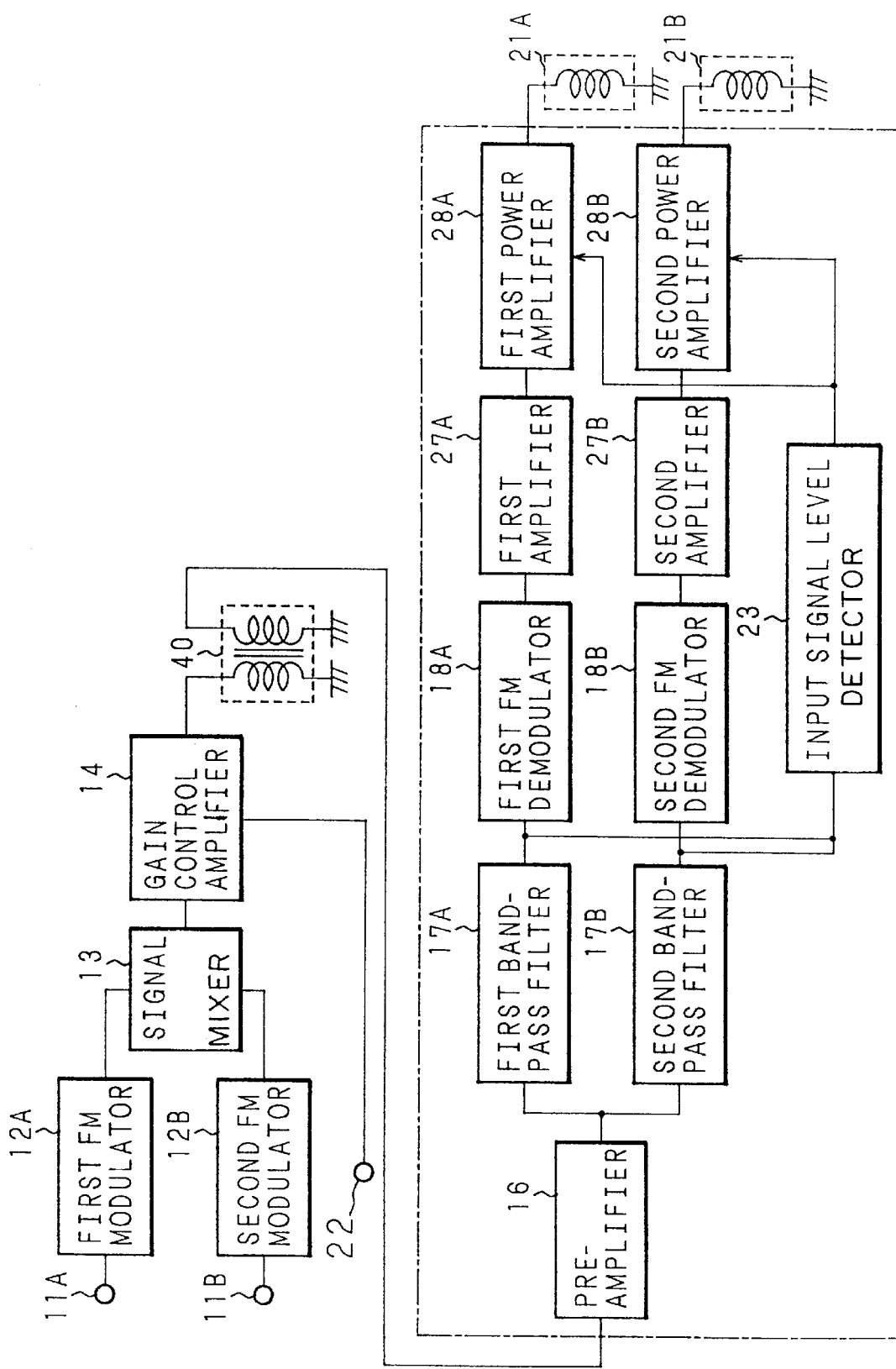
FIG. 4 is a block diagram showing part of a magnetic recording/reproducing device according to the present invention.
Figure 5:
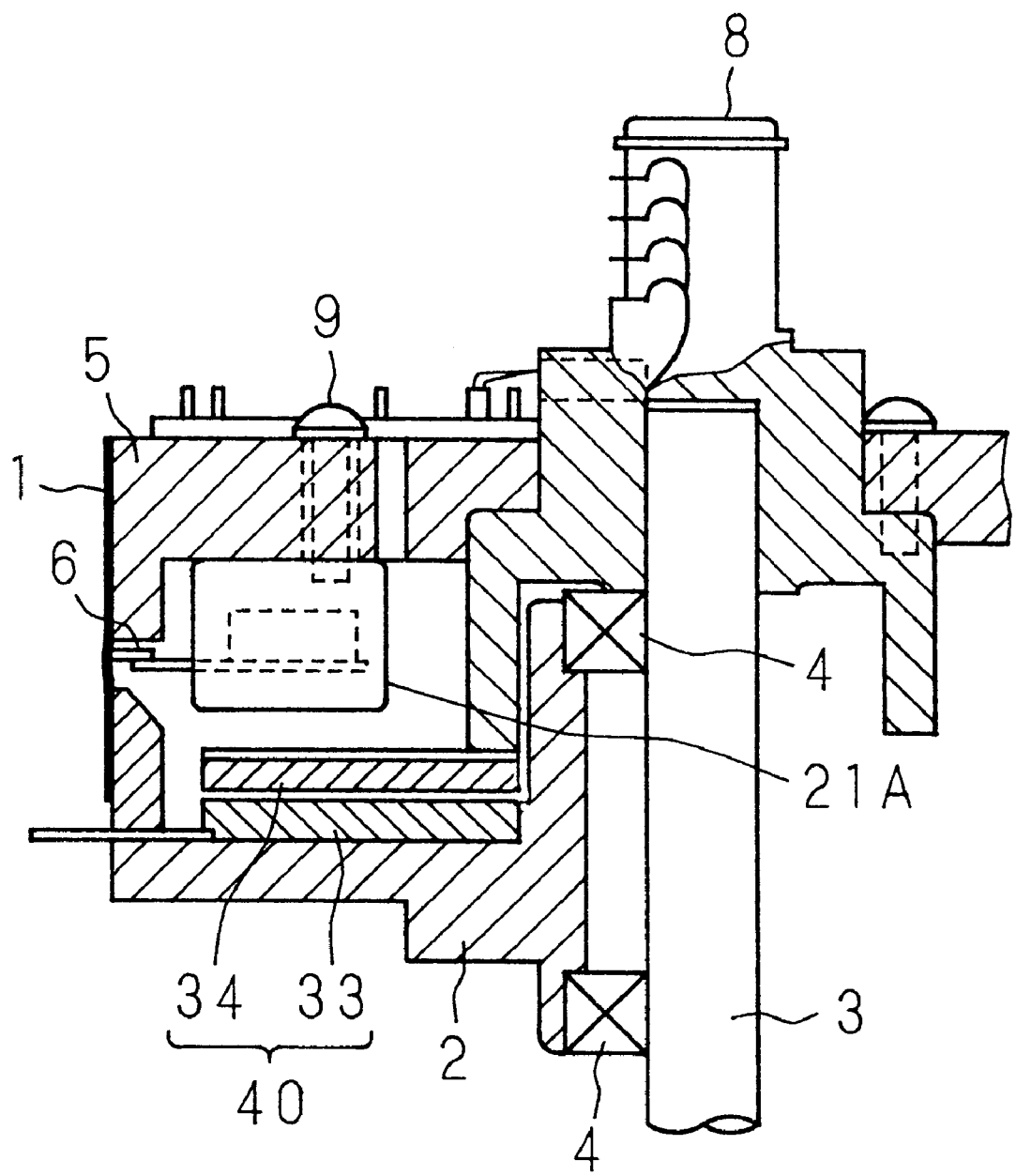
FIG. 5 is a partial cutaway vertical sectional view of a rotary drum according to the present invention.

FIG. 4 is a block diagram showing part of a magnetic recording/reproducing device according to this invention, and FIG. 5 is a partial cutaway vertical sectional view of a rotary drum used in the magnetic recording/reproducing device of FIG. 4. As shown in FIG. 5, an electromagnetically driven type actuator (i.e., an electromechanical transducing element; hereinafter referred to as the "actuator") 21A is fixed to an upper drum 5 with a screw 9 so as to be rotatable around a rotation axis 3. The rotation axis 3 is supported by bearings 4 fixed to a lower drum 2. A magnetic tape 1, that is, a magnetic recording medium, is obliquely slid along a tape guide (not shown) on the outer surfaces of the upper drum 5 and the lower drum 2. A rotary magnetic head 6 for recording and reproducing an image signal is adhered to the top of a movable plate disposed on the actuator 21A. The magnetic head 6 can be moved in the direction along the rotation axis 3 by applying a control signal to the actuator 21A as described in detail below.

The rotary drum has another similar actuator 21B on the other side of the rotation axis 3 so as to oppose the actuator 21A. The control of the actuators 21A and 21B will be described referring to FIG. 4.

As shown in FIG. 4, first and second control voltage input terminals 11A and 11B are respectively provided with regard to the first and the second actuators 21A and 21B.

A first control voltage inputted through the first control voltage input terminal 11A is inputted to a first FM modulator 12A. In the first FM modulator 12A, a first carrier frequency $f_1$ (MHz) is FM modulated to have a desired band by using the first control voltage. A second control voltage inputted through the second control voltage input terminal 11B is inputted to a second FM modulator 12B. In the second FM modulator 12B, a second carrier frequency $f_2$ (MHz) is FM modulated to have a desired band by using the second control voltage. First and second FM modulated signals respectively outputted from the first and the second FM modulators 12A and 12B are inputted to signal mixer 13, in which respective FM modulated signals are mixed to be outputted.

The FM modulated signal outputted from the signal mixer 13 is inputted to a gain control amplifier 14, thereby supplying a desired current to a supplying coil in a rotary transformer 40. At this point, a gain control signal is inputted to the gain control amplifier 14 through a gain control input terminal 22, thereby adjusting the value of a current to be outputted to the rotary transformer 40 in accordance with the operation mode of the magnetic head 6.

As is described below, a coil for transmitting a control signal for the actuator and coils for image and audio signals are concentrically wound in the rotary transformer 40. Therefore, the control signal for the actuator can give a crosstalk to the coils for image and audio signals or receive a crosstalk from the other coils described below depending upon the operation mode of the magnetic head 6. For example, in the recording mode, since a large current for recording flows through the coils for image and audio signals, the coil for a control signal for the actuator tends to receive a crosstalk due to the large current. In such a case, the current value of the control signal for the actuator is raised, thereby avoiding the crosstalk. In the reproducing mode, since a small current for reproducing a signal flows through the coils for image and audio signals, the coil for a control signal for the actuator tends to give a crosstalk to the coils for image and audio signals. In such a case, the current value of a control signal for the actuator is lowered, thereby avoiding the crosstalk. In this manner, the current value of the control signal for the actuator is adjusted so as to reduce the number of crosstalks caused among the coils. A control signal for the actuator herein indicates an FM modulated signal to be supplied from the gain control amplifier 14 to the supplying coil in the rotary transformer 40.

As shown in FIG. 5, the rotary transformer 40 is constituted of an upper transformer 34 and a lower transformer 33. The upper transformer 34 is fixed to the upper drum 5 so as to be rotatable around the rotation axis 3. On a surface of the upper transformer 34 opposing the lower transformer 33, a plurality of grooves are formed concentrically with the rotation axis 3, and a coil is provided in each of these grooves. The lower transformer 33 is fixed to the lower drum 2. On a surface of the lower transformer 33 opposing the upper transformer 34, a plurality of grooves are also formed concentrically with the rotation axis 3, and a coil is provided in each of these grooves.

Figure 6:
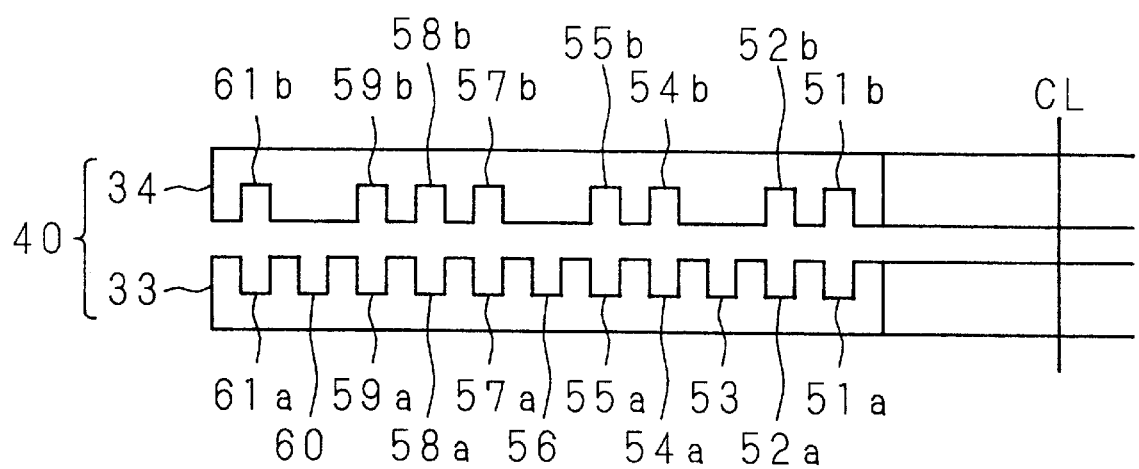
FIG. 6 shows the arrangement of grooves in a rotary transformer according to the present invention.

FIG. 6 is a vertical sectional view of the rotary transformer 40. As mentioned above, on the surface of the lower transformer 33 opposing the upper transformer 34 are formed grooves 51a, 52a, 54a and 55a for the coils for transmitting image signals and grooves 57a and 59a for the coils for transmitting audio signals in this order from the center. Further, a groove 61a for the coil for transmitting a control signal for the actuator is formed in the outermost portion.

On the surface of the upper transformer 34 opposing the lower transformer 33, grooves are also formed so as to face the above-mentioned grooves. As shown in FIG. 6, the grooves shown with the same reference numeral followed by a or b make one pair. A groove 58a formed between the grooves 57a and 59a and a groove 58b facing the groove 58a are used for coils for transmitting signals for erasing recorded signals on the magnetic tape. Grooves 53, 56 and 60 formed on the lower transformer 33 are designated as short rings, each of which contains a coil whose ends are connected to each other. Such a short ring works for reducing the number of crosstalks between the adjacent coils as described below.

The FM modulated signal supplied to the rotary transformer 40 is transmitted to a receiving coil in the rotary transformer 40, and is inputted to a preamplifier 16 to be amplified as shown in FIG. 4. The output signal from the preamplifier 16 is inputted to first and second band-pass filters 17A and 17B. A first FM modulated signal with a band including the first carrier frequency $f_1$ (MHz) at the center is extracted in the first band-pass filter 17A, and a second FM modulated signal with a band including the second carrier frequency $f_2$ (MHz) at the center is extracted in the second band-pass filter 17B.

The extracted first FM modulated signal is inputted to a first FM demodulator 18A, in which the first FM modulated signal is demodulated into a first control signal substantially identical to the original first control signal. Similarly, the extracted second FM modulated signal is inputted to a second FM demodulator 18B, in which the second FM modulated signal is demodulated into a second control signal substantially identical to the original second control signal. The first and the second FM modulated signals are also inputted to input signal level detector 23.

In such a modulation and demodulation process, a first control signal inputted from the input terminal 11A with a predetermined voltage value of, for example, 2.5 V is modulated to have a predetermined carrier frequency $f_1$ of, for example, 2.4 MHz, and the carrier signal of 2.4 MHz is demodulated into the control signal of 2.5 V in the demodulation process. Similarly, a second control signal with a predetermined voltage value of, for example, 2.5 V is modulated to have a predetermined carrier frequency $f_2$ of, for example, 2.8 MHz, and the carrier signal of 2.8 MHz is demodulated into the control signal of 2.5 V. By demodulating a carrier frequency corresponding to the carrier frequency used in modulation in this manner, the DC component of the control signal is transmitted wirelessly. The voltage value of the inputted signal and the carrier frequency are not limited to the above-mentioned figures, and any voltage and frequency other than the above examples can attain the same effect.

The demodulated signals from the first and the second FM demodulator 18A and 18B are respectively inputted to first and second amplifiers 27A and 27B each having a voltage shifting function, and then to the first and the second actuators 21A and 21B. The input signal level detector 23 detects the signal transmission in accordance with the output level of the signals inputted from the first and the second band-pass filters 17A and 17B. As a result of the detection, the input signal level detector 23 outputs signals to first and second power amplifiers 28A and 28B. For example, when one or both of the first and the second FM modulated signals have a low level, or when a supply voltage is applied, the input signal level detector 23 outputs signals to the first and the second power amplifiers 28A and 28B. This output of the signals allows the first and the second power amplifiers 28A and 28B to supply a predetermined control voltage to the first and the second actuators 21A and 21B, thereby setting the initial position of the magnetic head at a predetermined position.

When the actuator is contained in the rotary drum as shown in FIG. 5, the initial position of the magnetic head with regard to the rotation axis depends upon the assembling accuracy of the actuator itself. It is practically impossible to construct the actuator at an accuracy of several microns so as to place the magnetic head at a predetermined position with regard to the rotation axis. As a result, the initial position of the magnetic head assembled in the rotary drum is deviated from the predetermined position. The initial positional deviation of the magnetic head is therefore electrically compensated by applying a control voltage with a predetermined value to the actuator.

The actuators 21A and 21B work as a resonator having the magnetic heads, and have a mechanical resonance point indicated as a resonance frequency f0. If an output signal is intermittently generated from the input signal level detector 23 when the position of the magnetic head is largely deviated, the actuators 21A and 21B resonate at the resonance frequency f0. As a result, the actuators 21A and 21B not only become uncontrollable but also can be damaged. In order to avoid this, the input signal level detector 23 is allowed to have a hysteresis against the detection level, thereby preventing the intermittent generation of the output voltage.

A portion surrounded with a broken line in FIG. 4 indicates a circuit block to be provided on the upper drum 5.

When information is recorded on a magnetic tape or recorded information is reproduced by using the magnetic recording/reproducing device having the aforementioned structure, first and second control signals for controlling the positional change of the respective magnetic heads are respectively inputted through the first and the second input terminals 11A and 11B to be FM modulated.

Figure 7:
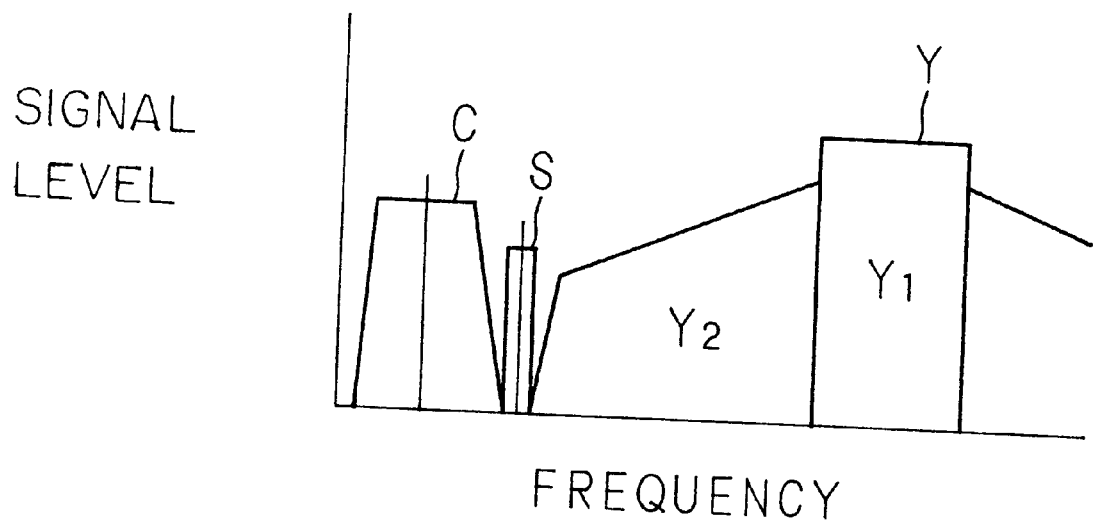
FIG. 7 shows the frequency bands of signals to be transmitted in the rotary transformer.

The FM modulation band used at this point will now be described. In a general home VTR, a luminance signal component (i.e., a Y signal) indicating brightness and a color signal component (i.e., a C signal) having information on colors are separated from a signal system designated as NTSC or PAL. Then, a carrier signal is FM modulated by the Y signal and the C signal is converted into a low frequency signal. With regard to a audio signal, a carrier signal different from that used in the FM modulation by the Y signal is FM modulated in each channel. FIG. 7 is a graph showing the relationship between the frequency of each signal applied to the magnetic head and the signal level. In this graph, $Y_1$ indicates the band of the carrier of the FM modulated signal, i.e., the luminance signal frequency band. On the lower frequency side of the luminance signal frequency band. On the lower frequency side of the luminance signal frequency band $Y_1$ is a lower side frequency band $Y_2$. On the still lower frequency side of the lower side frequency band $Y_2$ is a band S of an FM modulated audio signal. A plurality of speech carriers are present in the band S. On the still lower frequency side of the band S is a band C of a low-pass band-pass color signal.

In this example, the first and the second carrier frequencies of the first and the second control signals are lower than the luminance signal frequency band Y1 and higher than the audio signal band S. Further, the first and the second carrier frequencies are set so as not to overlap the higher frequency part in the audio signal carrier frequency. The first and the second FM modulated signals that have been FM modulated in the above-mentioned manner are mixed to synthesize a control signal, which is transmitted wirelessly from the lower transformer 33 of the rotary transformer 40 to the upper transformer 34. Since the FM modulated signal has the above described modulation band, the FM modulated signals transmitted in the rotary transformer tends not to give or receive a crosstalk to or from audio signals.

Figure 8:
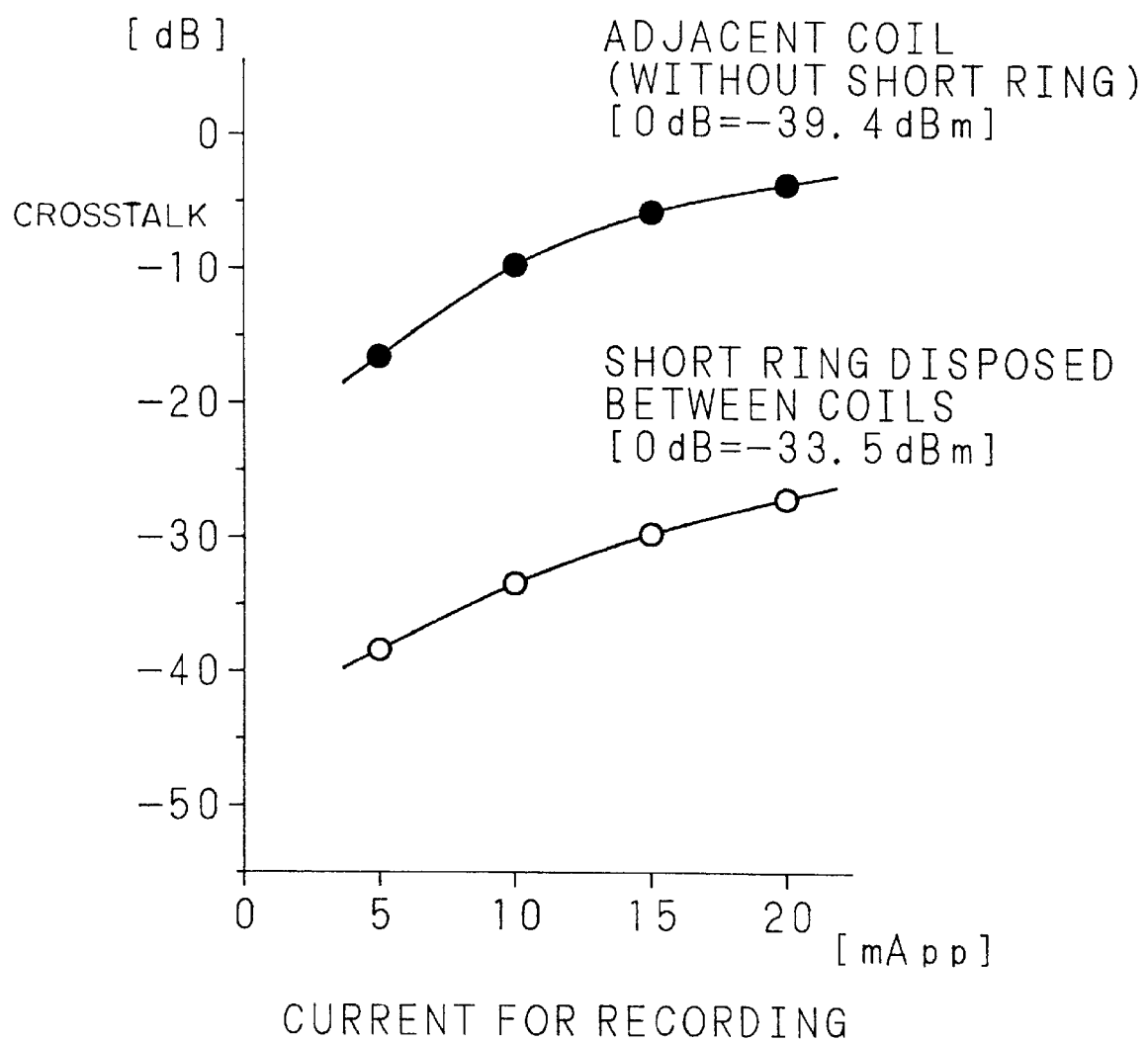
FIG. 8 shows the recording current—crosstalk characteristics.

In addition, as mentioned above, the grooves for the coils for transmitting control signals are formed in the outermost portions of the upper and the lower transformers 34 and 33, and the short rings are formed between the outermost groove and the inner grooves for audio signals. FIG. 8 shows the data on the crosstalk characteristics. In this graph, a crosstalk given from the coil for an audio signal to the adjacent coil for a control signal is shown with ●, and a crosstalk given from the coil for an audio signal to the coil for a control signal when a short ring is disposed therebetween is shown with ○. In the measurement, the transmission frequency of the audio signal is 1.3 MHz. As is apparent from FIG. 8, the presence of the short ring can reduce the number of crosstalks by more than 20 dB.

When a coil for a control signal is wound in the outermost groove of the rotary transformer 40 as in this example, one short ring is required in the inner portion. The position of the groove for a control signal, however, is not limited to this and can be between the grooves for an image signal or a audio signal. In the latter case, short rings are required to be formed so as to sandwich a groove for a control signal. Since the coupling coefficient of the rotary transformer becomes higher toward the rotation center thereof, it is generally preferred that a groove for an image signal is formed in the innermost portion and followed by the grooves for a audio signal and a control signal.

The FM modulated signal having been transmitted wirelessly via the rotary transformer 40 is separated, extracted and demodulated through the first and the second band-pass filters 17A and 17B to be supplied to the first and the second actuators 21A and 21B. Since a control signal for the actuator is transmitted through noncontact transmission in this manner, the magnetic head can stably trace the magnetic tape.

Alternatively, it is possible to use, as the first and the second carrier frequency bands, a frequency band that is lower than the color signal band C of FIG. 7 and is higher than the transmission lower limit frequency of the rotary transformer.

EXAMPLE 2

Figure 9:
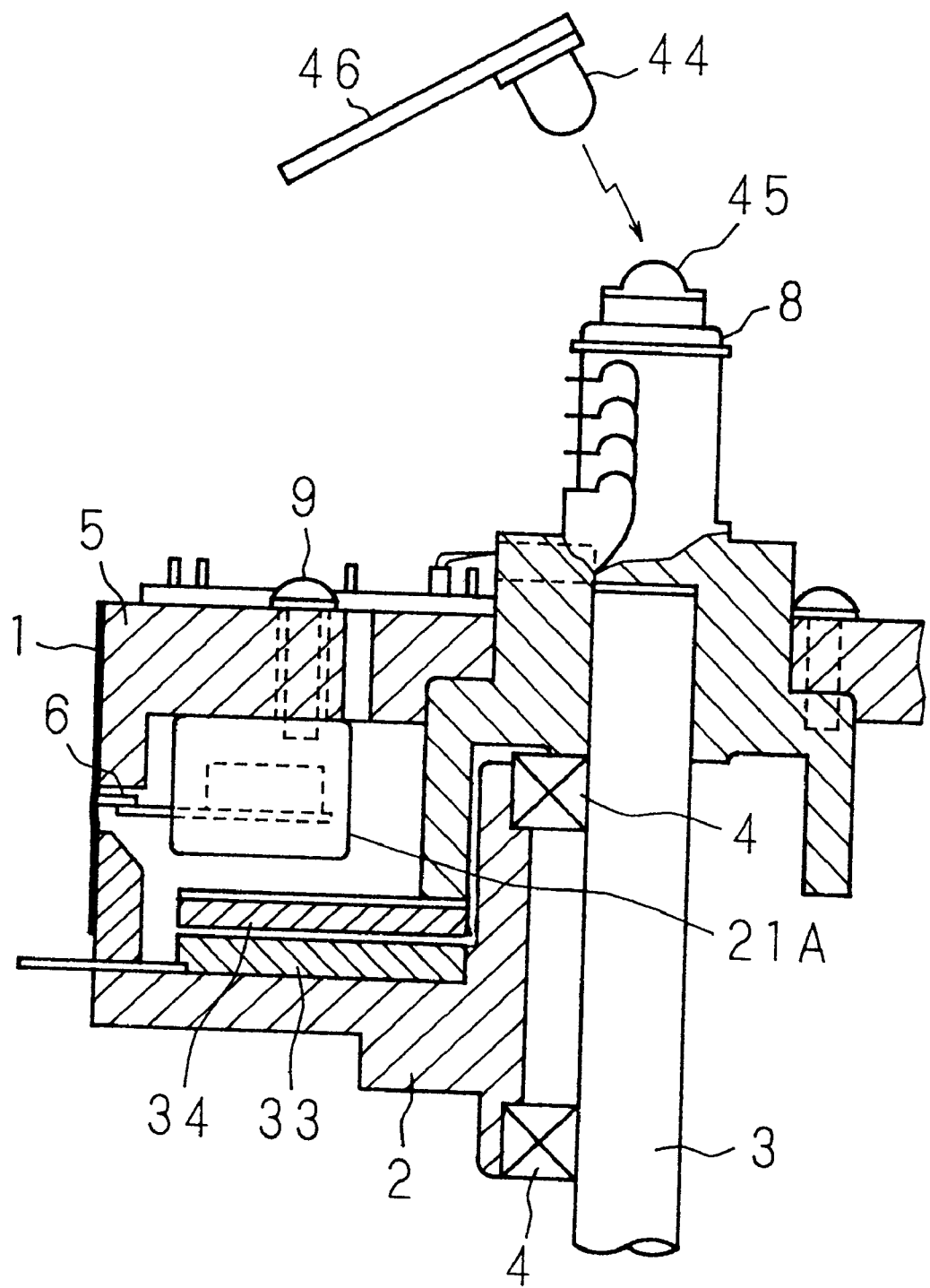
FIG. 9 is a partial cutaway vertical sectional view of another rotary drum according to the present invention.

Another example of the present invention will now be described based on the accompanying drawings. FIG. 9 is a partial cutaway vertical sectional view of a rotary drum used in a magnetic recording/reproducing device of this example. FIG. 10 is a block diagram showing part of the magnetic recording/reproducing device. As shown in FIG. 9, an actuator 21A is fixed to an upper drum 5 with a screw 9 so as to be rotatable around a rotation axis 3. A rotary magnetic head 6 for recording and reproducing an image signal is adhered to the top of a movable plate disposed on the actuator 21A.

A lower transformer 33 is fixed to a lower drum 2, and forms a rotary transformer together with a rotatable upper transformer 34 fixed to the upper drum 5. A signal to be recorded on a magnetic tape is transmitted from a coil in the lower transformer 33 to a coil in the upper transformer 34 to be supplied to the magnetic head 6. In the reproducing operation, the magnetic head 6 reads a signal from the magnetic tape, and the read signal is transmitted by the reverse route.

An optical signal receiving element 45 is provided on a shaft including the rotation center of the rotation axis 3. An optical signal emitting element 44 disposed on a mounting member 46 is provided obliquely above the optical signal receiving element 45. The optical signal receiving element 45 receives an optical signal from the optical signal emitting element 44. The optical signal receiving element 45 has a lens with a converging effect at the top, and this lens makes large the tolerance in the mounting position of the optical signal emitting element 44. The optical signal sent from the optical signal emitting element 44 is a control signal for the actuator. By supplying the control signal to the actuator 21A, the magnetic head 6 can be moved in the direction along the rotation axis 3. A photodiode and a phototransistor are generally used as the optical signal emitting element 44 and the optical signal receiving element 45, respectively.

In this example, the optical signal receiving element 45 and the optical signal emitting element 44 are disposed above the rotation axis 3. The positions of these elements are, however, not limited to the above, and can be below the rotation axis 3 as occasion demands. When these elements are below the rotation axis 3, they can be advantageously shaded from an interference light.

The rotary drum has another similar actuator 21B on the other side of the rotation axis 3 so as to oppose the actuator 21A. These two actuators are controlled as follows:

In the block diagram of FIG. 10, reference numerals 11A and 11B denote first and second control voltage input terminals, through which control signals for the actuators are inputted. A first control voltage inputted through the first control voltage input terminal 11A is inputted to a first FM modulator 12A. In the first FM modulator 12A, a first carrier frequency $f_1$ (MHz) is FM modulated to have a predetermined band by using the first control voltage. A second control voltage inputted through the second control voltage input terminal 11B is inputted to a second FM modulator 12B. In the second FM modulator 12B, a second carrier frequency $f_2$ (MHz) is FM modulated to have a predetermined band by using the second control voltage. First and second FM modulated signals outputted from the first and the second FM modulators 12A and 12B are inputted to signal mixer 13, in which the respective modulated signals are mixed to be outputted.

The frequency modulated signal outputted from the signal mixer 13 is inputted to optical signal emitter 42 including the optical signal emitting element 44. The optical signal emitter 42 emits an optical spectrum having an intensity in accordance with the level of the inputted frequency modulated signal. The optical spectrum is received by optical signal receiver 43 including the optical signal receiving element 45 to be converted into an FM modulated signal substantially identical to the original FM modulated signal. The optical signal emitter 42 and the optical signal receiver unit 43 form optical signal transmission unit 41.

The FM modulated signal outputted from the optical signal receiver 43 is inputted to first and second bandpass filters 17A and 17B, where first and second FM modulated signals are extracted. These extracted FM modulated signals are supplied to the first and the second actuators 21A and 21B as the first and the second control signals in the same manner as in Example 1 shown in FIG. 4. In FIG. 10, the same reference numerals as in FIG. 4 are used to refer to the same elements, and the description thereof is omitted.

When information is recorded on a magnetic tape or recorded information is reproduced by using the magnetic recording/reproducing device having the aforementioned structure, a control signal for controlling the positional change of each magnetic head is transmitted wirelessly by the optical signal transmission unit 41 to be supplied to each of the actuators 21A and 21B. As a result, the magnetic head can stably trace the magnetic tape.

In this example, both modulation and demodulation are conducted by using a control signal having a predetermined voltage value and a predetermined FM modulation frequency corresponding to the voltage value, as in Example 1. Thus, the DC component of the control signal can be transmitted even through the modulation/demodulation process.

Also in this example, the level of the transmitted FM modulated signal is detected by input signal level detector 23. When the detected level is low, a desired voltage is supplied to a power amplifier. The initial position of the magnetic head can be thus compensated. Further, it is useful to allow the input signal level detector 23 to have a hysteresis against the detection level in order to avoid the damage of the actuators caused by the mechanical resonance described in Example 1.

In addition, equipment for wireless transmission of speech and image signals have recently been commercially available, and the optical signal transmission unit 41 can be easily fabricated by using the similar technique to that used in such equipment.

EXAMPLE 3

Still another example for the present invention will now be described referring to the accompanying drawings.

Figure 11:
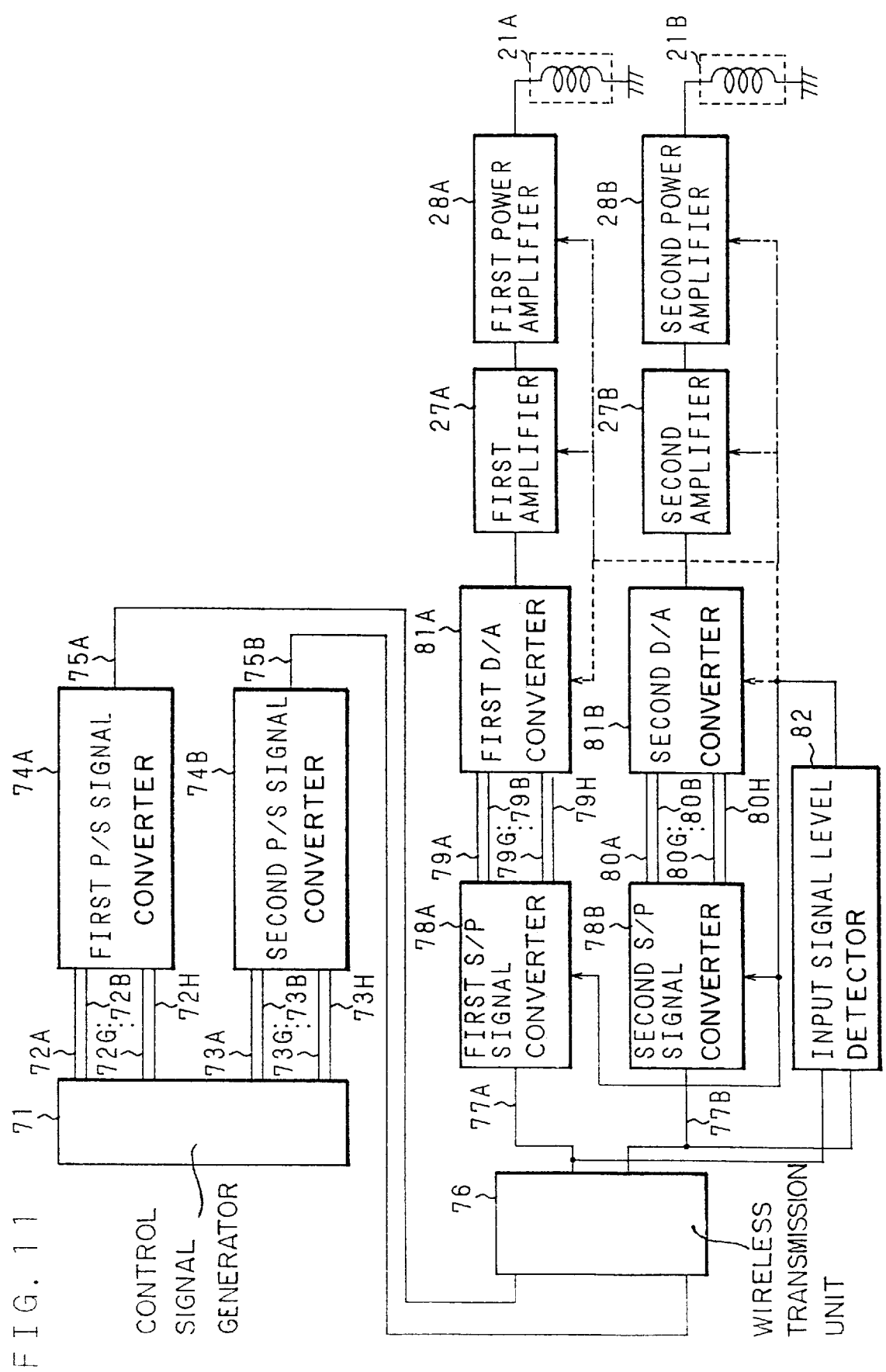
FIG. 11 is a block diagram of part of a magnetic recording/reproducing device of Example 3.

FIG. 11 is a block diagram showing part of a magnetic recording/reproducing device of this example. Control signal generator 71 generates a control signal corresponding to a control voltage to be applied to each of actuators 21A and 21B. A first control signal is a parallel signal comprising plural bits represented by 72A through 72H and a second control signal is a parallel signal comprising plural bits represented by 73A through 73H. Such a parallel signal, i.e., a control signal is inputted to first and second parallel/serial signal converters (hereinafter referred to as the "P/S signal converters") 74A and 74B from the control signal generator 71.

The first P/S signal converter 74A converts the first control signal into a serial signal 75A strung one bit by one bit of the parallel signal. Similarly, the second P/S signal converter 74B converts one bit string of the second control signal into a serial signal 75B.

Figure 12:
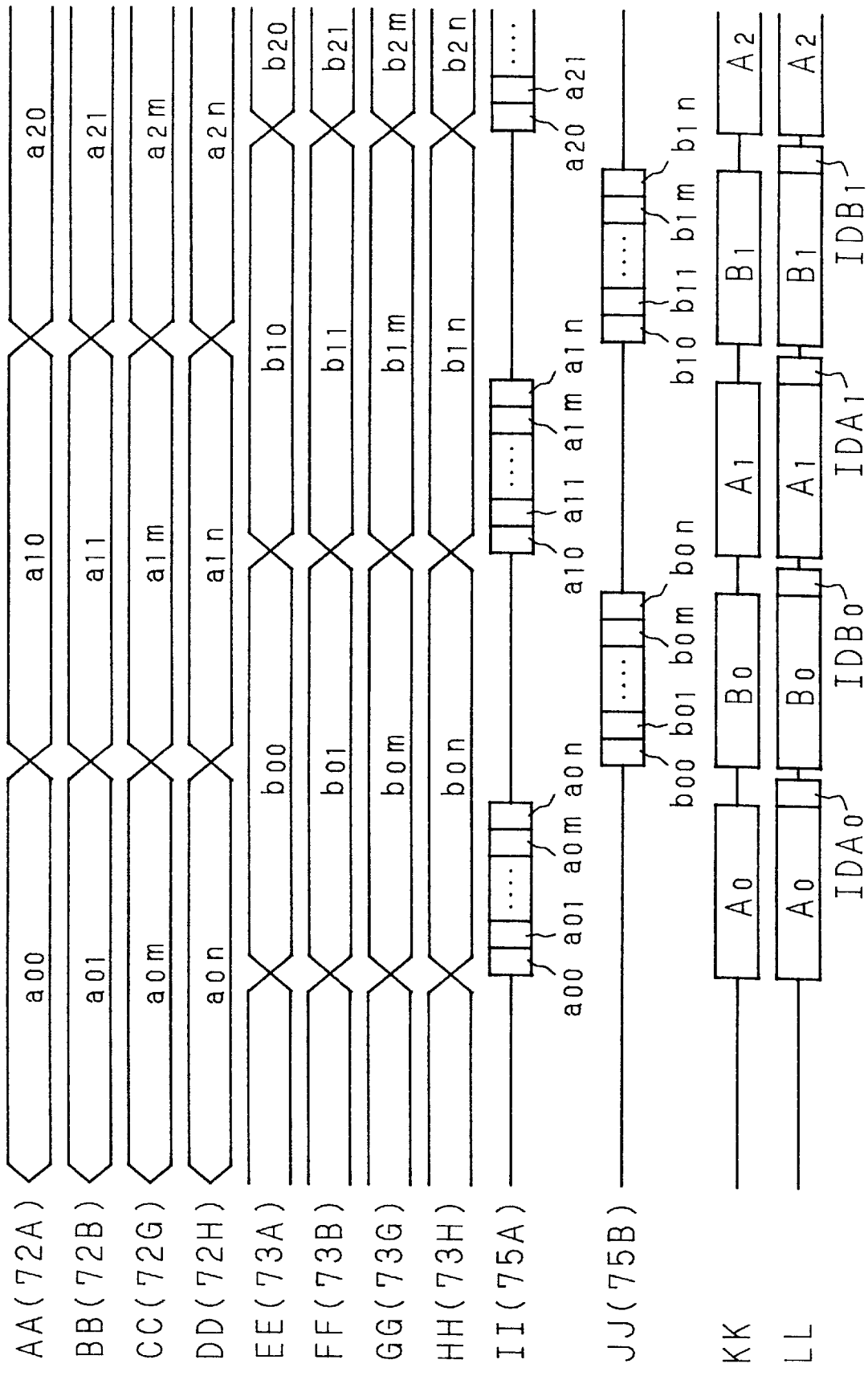
FIG. 12 shows the timing of the serial signal transmission of Example 3.

FIG. 12 shows the transmission timing of the control signals and of those converted as described below. In FIG. 12, AA, BB, CC and DD indicate four bits of a parallel signal constituting a first control signal. Bits 72A, 72B, 72G and 72H are herein exemplified. Such a first control signal is P/S converted as one unit word by the first P/S signal converter 74A. A P/S converted serial signal 75A denoted by II in FIG. 12 is inputted to wireless transmission unit 76.

Similarly, EE, FF, GG and HH indicate four bits of a parallel signal constituting a second control signal. Bits 73A, 73B, 73G and 73H are herein exemplified. Such a second control signal is P/S converted as one unit word by the second P/S signal converter 74B. A P/S converted serial signal 75B denoted by JJ in FIG. 12 is also inputted to the wireless transmission unit 76.

Figure 13:
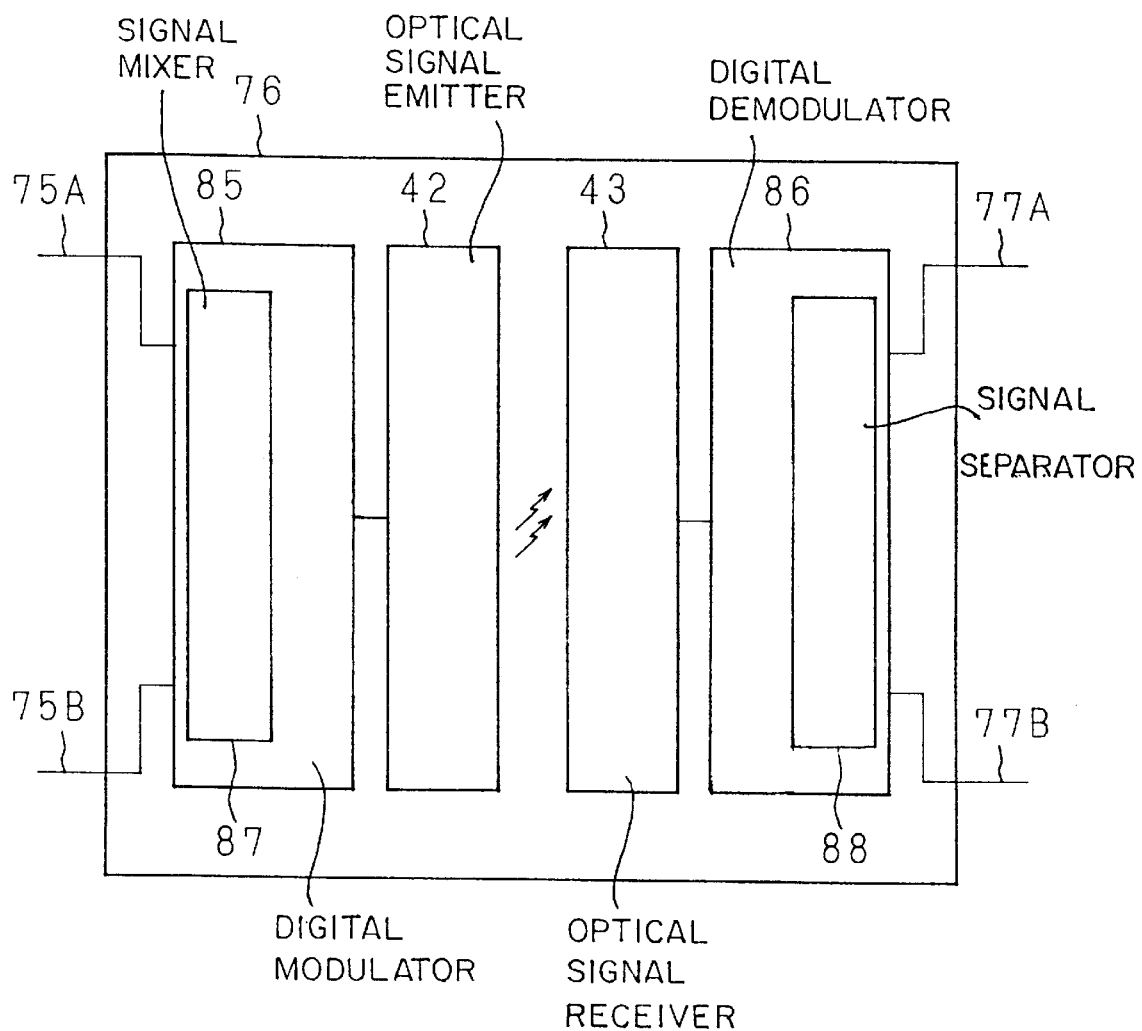
FIG. 13 is a block diagram showing wireless transmission means of Example 3.

FIG. 13 is a block diagram showing the structure of the wireless transmission unit 76. The serial signals 75A and 75B respectively outputted from the first and the second P/S signal converters 74A and 74B are inputted to digital modulators 85 in the wireless transmission unit 76. The digital modulator 85 includes signal mixer 87, and performs digital modulation such as pulse position modulation by mixing the inputted serial signals 75A and 75B.

A digital modulated serial signal KK having been modulated in the digital modulator 85 by mixing the signals II and JJ shown in FIG. 12 is inputted to optical signal emitter 42. Then, an ID word is added to each unit word of the digital modulated serial signal KK as is shown as a digital modulated serial signal LL in FIG. 12. The optical signal emitter 42 transmits wirelessly the digital modulated serial signal LL by using an optical signal as a carrier. In this manner, the data carried by the first control signal and that carried by the second control signal are alternately transmitted through one transmission route.

The contents of the ID word added to the digital modulated serial signal LL are used as additional information for control or for a synchronizing treatment of the serial signal transmission. The ID word can be added to either end of each unit word. Further, when the ID word is added to a portion regarding either the first control signal or the second control signal alone, the same effect can be attained.

The optical signal having been transmitted wirelessly is received by optical signal receiver 43. The optical signal receiver 43 has a signal detection element above the rotation axis as that shown in FIG. 9. The optical signal having been received by the optical signal receiver 43 is inputted to digital demodulator 86. The digital demodulator 86 includes signal separator 88, and demodulates and separates the optical signal into serial signals 77A and 77B.

The serial signals 77A and 77B are inputted to first and second serial/parallel signal converters (hereinafter referred to as the "S/P signal converters") 78A and 78B as shown in FIG. 11. Therefore, the signals 75A and 75B are substantially identical to the signals 77A and 77B, respectively.

The first S/P signal converter 78A converts the inputted serial signal 77A into a parallel signal comprising plural bits represented by 79A through 79H, and outputs the parallel signal to first digital/analog converter (hereinafter referred to as the "D/A converter") 81A. Similarly, the second S/P signal converter 78B converts the inputted serial signal 77B into a parallel signal comprising plural bits represented by 80A through 80H, and outputs the parallel signal to second A/D converter 81B.

The serial signals 77A and 77B outputted from the wireless transmission unit 76 are also inputted to input signal level detector 82. When one or both of these serial signals have a low level or when a supply voltage is applied, the input signal level detector 82 generates an output signal. Owing to this output signal, a control voltage to be supplied to the first and the second actuators 21A and 21B is adjusted to have a predetermined value.

The following three methods can be used to set the control voltage at a predetermined value: First, the output from the input signal level detector 82 is inputted to the first and the second S/P converters 78A and 78B as shown with a solid line with an arrow in FIG. 11. In response to this output signal, the first and the second S/P converters 78A and 78B output predetermined digital values to the first and the second D/A converters 81A and 81B. Secondly, the output from the input signal level detector 82 is inputted to the first and the second D/A converters 81A and 81B as shown with a dashed line with an arrow in FIG. 11. In response to this output signal, the first and the second D/A converters 81A and 81B output predetermined analog voltage values to first and second amplifiers 27A and 27B. Thirdly, the output from the input signal level detector 82 is inputted to the first and the second amplifiers 27A and 27B or to first and the second power amplifiers 28A and 28B as shown with a broken line with an arrow in FIG. 11. In response to this output, the first and the second amplifiers 27A and 27B or the first and the second power amplifiers 28A and 28B supply predetermined control voltages to the first and the second actuators 21A and 21B. By using any of the above-mentioned methods, a control voltage to be supplied to the actuators can be set at a predetermined value, resulting in compensating the initial position of the magnetic head as described in Example 1.

Moreover, it. is also useful to allow the input signal level detector 82 to have a hysteresis against the detection level in order to avoid the damage of the actuators due to the mechanical resonance.

When information is recorded on a magnetic tape or recorded information is reproduced by using the magnetic recording/reproducing device having the aforementioned structure, a digital signal for controlling the positional change of the magnetic head is converted into a serial signal, pulse position modulated, and transmitted wirelessly. The transmitted signal is demodulated, converted into a parallel signal, and converted into an analog signal to the supplied to the actuator. Since a control signal is transmitted through noncontact transmission in this manner, the magnetic head can stably trace the magnetic tape. Further, since the DC component to be transmitted is included in the digital value, less electrical adjustment such as adjustment of a carrier frequency is required in this example than in the aforementioned examples in which transmission is performed by using an FM modulated signal. As a result, the system provided by this example is stable also in point of transmission time.

In the above-mentioned examples, a magnetic recording/reproducing device is exemplified as a magnetic head unit. The present invention, however, is not limited to this, and can be adopted in any magnetic recording device or magnetic reproducing device having a movable magnetic head. The invention can also be used in a DAT (digital audio tape) recorder having a movable magnetic head for recording/reproducing a audio signal.

As is described above, the present invention can effectively attain a stably operable and highly reliable system for a magnetic recording/reproducing device using a driving element such as an electromagnetically driven type actuator for the positional change of the magnetic head because a control signal to be supplied to the driving element is transmitted through noncontract transmission. Moreover, since it is possible to electrically compensate the initial position of the magnetic head that is generally deviated depending upon accuracy in the components and assembling of the electromagnetically driven type actuator, inexpensive components can be used to fabricate the actuator. Therefore, the present invention provides a system also useful for home appliances.

As this invention may be embodied in several forms without departing from the spirit of essential characteristics thereof the present embodiment is therefore illustrative and not restrictive, since the scope of the inventions is defined by the appended claims rather than by the description preceding them, and all changes that fall within metes and bounds of the claims, or equivalence of such metes and bounds thereof are therefore intended to be embraced by the claims.

What is claimed is:

1. A movable magnetic head unit comprising:

a rotary drum mounted on a shaft and rotatable about a rotational axis of the shaft;

a stationary drum;

a rotary magnetic head mounted upon said rotary drum for tracing a track of a magnetic tape which runs along outer peripheral surfaces of said rotary and stationary drums;

head transducing means, mounted on said rotary drum, for driving said rotary magnetic head along a direction parallel to the rotational axis of the shaft in accordance with a position control signal; and transmission means for wirelessly transmitting the position control signal to said rotary drum and for providing the received position control signal to said head transducing means.

2. The movable magnetic head unit of claim 1, wherein said transmission means comprises:

optical transmission means, mounted exteriorly of said rotary drum, for converting the position control signal into an optical signal and for emitting the optical signal; and optical receiving means mounted on an upper end of the shaft, for receiving and converting the transmitted optical signal into the received position control signal and for providing the received position control signal to said head transducing means.

3. The movable magnetic head unit of claim 2, wherein said optical transmission means comprises:

frequency modulation means for frequency modulating the position control signal; and optical emitter means for converting the frequency modulated position control signal into the optical signal and emitting the optical signal.

4. The movable magnetic head unit of claim 3, wherein said optical receiving means comprises:

optical reception means for receiving the transmitted optical signal and converting the received optical signal into the frequency modulated position control signal; and frequency demodulation means, coupled to said optical reception means, for demodulating the frequency modulated position control signal output from said optical reception means into the received position control signal and for providing the received position control signal to said head transducing means.

5. The movable magnetic head unit of claim 2, wherein said optical receiving means comprises a converging lens mounted on the upper end of the shaft.

6. The magnetic head unit of claim 1, wherein said transmission means comprises:

stationary transformer means, mounted on said stationary drum, for wirelessly transmitting the position control signal; and rotary transformer means, mounted on said rotary drum opposing said stationary transformer, for receiving the position control signal transmitted by said stationary transformer means and for providing the received position control signal to said head transducing means.

7. The movable magnetic head unit of claim 6, wherein said stationary transformer means comprises:

FM modulation means for frequency modulating the position control signal; and a stationary transformer, coupled to said FM modulation means, having a coil formed within a groove thereof opposing said rotary transformer means for transmitting the frequency modulated position control signal to said rotary transformer means as the position control signal.

8. The movable magnetic head unit of claim 7, wherein said stationary transformer has a plurality of concentric coils, an outermost one of which is said coil and at least one of the plurality of concentric coils adjacent said coil being terminated.

9. The movable magnetic head unit of claim 6, wherein said rotary transformer means comprises:

a rotary transformer having a coil formed within a groove thereof opposing said stationary transformer means for receiving a frequency modulated position control signal transmitted from said stationary transformer means as the position control signal; and FM demodulation means, coupled to said rotary transformer, for frequency demodulating the received frequency modulated position control signal into the received position control signal and for providing the received position control signal to said head transducing means.

10. The movable magnetic head unit of claim 9, wherein said rotary transformer has a plurality of concentric coils, an outermost one of which is said coil and at least one of the plurality of concentric coils adjacent said coil being terminated.

11. The movable magnetic head unit of claim 1, further comprising level detection means, coupled to said transmission means and mounted on said rotary drum for detecting a current level of the received position control signal and for adjusting the received position control signal to change a position of said rotary magnetic head to a predetermined position when the detected current level is lower than a desired level.

12. A movable magnetic head unit comprising:

a rotary drum mounted on a shaft and rotatable about a rotational axis of the shaft;

a stationary drum;

a plurality of rotary magnetic heads mounted upon said rotary drum for tracing a track of a magnetic tape which runs along outer peripheral surfaces of said rotary and stationary drums;

a plurality of head transducing means, mounted on said rotary drum, for respectively driving said plurality of rotary magnetic heads along a direction parallel to the rotational axis of the shaft in accordance with position control signals; and transmission means for wirelessly transmitting the position control signals to said rotary drum and for providing the received position control signals to said plurality of head transducing means.

13. The movable magnetic head unit of claim 12, wherein said transmission means comprises:

optical transmission means, mounted exteriorly of said rotary drum, for converting the position control signals into an optical signal and for emitting the optical signal; and optical receiving means mounted on an upper end of the shaft, for receiving and converting the transmitted optical signal into the received position control signals and for providing the received position control signals to said head transducing means.

14. The movable magnetic head unit of claim 13, wherein said optical transmission means comprises:

frequency modulation means for frequency modulating each of the position control signals at different respective carrier frequencies;

mixing means, coupled to said frequency modulation means, for mixing the frequency modulated position control signals into a mixed signal; and optical emitter means for converting the mixed signal into the optical signal and emitting the optical signal.

15. The movable magnetic head unit of claim 14, wherein said optical receiving means comprises:

optical reception means for receiving the transmitted optical signal and converting the received optical signal into the mixed signal;

separation means, coupled to said optical reception means, for separating the mixed signal into the frequency modulated position control signals; and frequency demodulation means, coupled to said separation means, for FM demodulating the frequency modulated position control signals output from said separation means into the received position control signals and for providing the received position control signals respectively to said plurality of head transducing means.

16. The movable magnetic head unit of claim 14, further comprising level detection means, coupled to said separation means and mounted on said rotary drum, for detecting current levels of the received position control signals output from said separator means and for adjusting the received position control signals to change positions of respective ones of said plurality of rotary magnetic heads to predetermined positions when the detected current levels are lower than a desired level.

17. The movable magnetic head unit of claim 13, wherein said optical receiving means comprises a converging lens mounted on the upper end of the shaft.

18. The magnetic head unit of claim 12, wherein said transmission means comprises:

stationary transformer means, mounted on said stationary drum, for wirelessly transmitting the position control signals; and rotary transformer means, mounted on said rotary drum opposing said stationary transformer means, for receiving the position control signals transmitted by said stationary transformer means and for providing the received position control signals respectively to said plurality of head transducing means.

19. The movable magnetic head unit of claim 18, wherein said stationary transformer means comprises:

FM modulation means for frequency modulating each of the position control signals at different respective carrier frequencies;

mixing means, coupled to said FM modulation means, for mixing the frequency modulated position control signals into a mixed signal; and a stationary transformer, coupled to said mixing means, having a coil formed within a groove thereof opposing said rotary transformer means for transmitting the mixed signal to said rotary transformer means.

20. The movable magnetic head unit of claim 19, wherein said stationary transformer has a plurality of concentric coils, an outermost one of which is said coil and at least one of the plurality of concentric coils adjacent said coil being terminated.

21. The movable magnetic head unit of claim 18, wherein said rotary transformer means comprises:

a rotary transformer having a coil formed within a groove thereof opposing said stationary transformer means for receiving a mixed signal transmitted from said stationary transformer means as the position control signals;

separation means, coupled to said rotary transformer, for separating the mixed signal into frequency modulated position control signals; and FM demodulation means, coupled to said separation means, for frequency demodulating the frequency modulated position control signals output from said separation means into the received position control signals and for respectively providing the received position control signals to said plurality of head transducing means.

22. The movable magnetic head unit of claim 21, wherein said rotary transformer has a plurality of concentric coils, an outermost one of which is said coil and at least one of the plurality of concentric coils adjacent said coil being terminated.

* * * * *